United States Patent
Lee et al.

(10) Patent No.: US 9,390,854 B2
(45) Date of Patent: Jul. 12, 2016

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Chung Eun Lee, Suwon-Si (KR); Doo Young Kim, Suwon-Si (KR); Hang Kyu Cho, Suwon-Si (KR); Jong Ho Lee, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 126 days.

(21) Appl. No.: 14/335,532

(22) Filed: Jul. 18, 2014

(65) Prior Publication Data
US 2015/0318109 A1    Nov. 5, 2015

(30) Foreign Application Priority Data

Apr. 30, 2014    (KR) .................. 10-2014-0052843

(51) Int. Cl.
| | |
|---|---|
| *H01G 4/12* | (2006.01) |
| *H01G 4/30* | (2006.01) |
| *H01G 4/008* | (2006.01) |
| *B32B 37/24* | (2006.01) |
| *B32B 38/00* | (2006.01) |
| *H01G 4/38* | (2006.01) |
| *H01G 4/012* | (2006.01) |

(52) U.S. Cl.
CPC ........ *H01G 4/12* (2013.01); *B32B 37/24* (2013.01); *B32B 38/0036* (2013.01); *B32B 38/145* (2013.01); *H01G 4/0085* (2013.01); *H01G 4/012* (2013.01); *H01G 4/30* (2013.01); *H01G 4/385* (2013.01); *B32B 2305/77* (2013.01); *B32B 2307/202* (2013.01); *B32B 2307/204* (2013.01); *B32B 2315/02* (2013.01); *B32B 2457/16* (2013.01)

(58) Field of Classification Search
CPC ...... H01G 4/1227; H01G 4/0085; H01G 4/12; H01G 4/232; H01G 4/30
See application file for complete search history.

(56) References Cited

U.S. PATENT DOCUMENTS

| | | | |
|---|---|---|---|
| 5,668,694 A * | 9/1997 | Sato ................ | B32B 18/00 257/295 |
| 7,545,626 B1 * | 6/2009 | Kim ................ | H01G 4/255 361/306.1 |
| 2011/0056735 A1 | 3/2011 | Lee et al. | |
| 2011/0157768 A1 | 6/2011 | Hur et al. | |

FOREIGN PATENT DOCUMENTS

| | | |
|---|---|---|
| JP | 2007-149780 A | 6/2007 |
| KR | 10-2011-0077797 A | 7/2011 |
| KR | 10-1069989 B1 | 10/2011 |

* cited by examiner

*Primary Examiner* — Dion R Ferguson
(74) *Attorney, Agent, or Firm* — McDermott Will & Emery LLP

(57) ABSTRACT

A multilayer ceramic electronic component may include: a plurality of active parts including a plurality of dielectric layers and a plurality of internal electrodes that are alternately disposed, the plurality of active parts being stacked; an interlayer margin part disposed between the active parts adjacent to each other and containing magnesium; an upper cover part disposed on an upper portion of an uppermost active part among the plurality of active parts and containing magnesium; and a lower cover part disposed on a lower portion of a lowermost active part among the plurality of active parts and containing magnesium, wherein the upper and lower cover parts and the interlayer margin part include magnesium-nickel oxide layers formed on interfaces thereof adjacent to the active parts.

11 Claims, 3 Drawing Sheets

A-A'

MULTILAYER CERAMIC ELECTRONIC COMPONENT AND METHOD OF MANUFACTURING THE SAME

CROSS-REFERENCE TO RELATED APPLICATION

This application claims the benefit of Korean Patent Application No. 10-2014-0052843 filed on Apr. 30, 2014, with the Korean Intellectual Property Office, the disclosure of which is incorporated herein by reference.

BACKGROUND

The present disclosure relates to a multilayer ceramic electronic component and a method of manufacturing the same.

Generally, electronic components using ceramic materials, such as capacitors, inductors, piezoelectric elements, varistors, thermistors, and the like, include a ceramic body formed of a ceramic material, internal electrodes formed in the ceramic body, and external electrodes formed on surfaces of the ceramic body to be connected to the internal electrodes.

In accordance with the electronization of various functions in applications requiring high degrees of reliability and increases in demands thereon, in response thereto, demands also have been made for multilayer ceramic electronic components having high reliability.

As factors causing degradation in reliability, crack generation, delamination, breakdown voltage characteristics, and the like may be present, and residual carbon existing in a ceramic body of the multilayer ceramic electronic component may also affect reliability of the multilayer ceramic electronic component. Therefore, in order to improve reliability of the multilayer ceramic electronic component, an amount of the residual carbon in the ceramic body needs to be decreased.

RELATED ART DOCUMENT (Patent Document 1) Korean Patent Publication No. 10-1069989

SUMMARY

An exemplary embodiment in the present disclosure may provide a multilayer ceramic electronic component and a method of manufacturing the same.

According to an exemplary embodiment in the present disclosure, a multilayer ceramic electronic component may include a plurality of active parts; an interlayer margin part disposed between the active parts adjacent to each other; and upper and lower cover parts.

The interlayer margin part and the upper and lower cover parts may contain magnesium in an amount of 1 mol % or more.

In the multilayer ceramic electronic component according to an exemplary embodiment of the present disclosure, the upper and lower cover parts and the interlayer margin part may include magnesium-nickel oxide layers formed on interfaces thereof adjacent to the active parts.

According to an exemplary embodiment in the present disclosure, a method of manufacturing a multilayer ceramic electronic component may include: preparing a plurality of first green sheets for forming an active part, a plurality of second green sheets for forming an interlayer margin part, and a plurality of third green sheets for forming a cover part; printing an internal electrode pattern on the plurality of first green sheets; stacking the first to third green sheets to form a green sheet multilayer body; and sintering the green sheet multilayer body to prepare a ceramic body including a plurality of active parts, an interlayer margin part separating the active parts from each other, and cover parts disposed on an upper portion of an uppermost active part and a lower portion of a lowermost active part among the plurality of active parts.

The second green sheets and the third green sheets may contain magnesium in an amount of 1 mol % or more.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
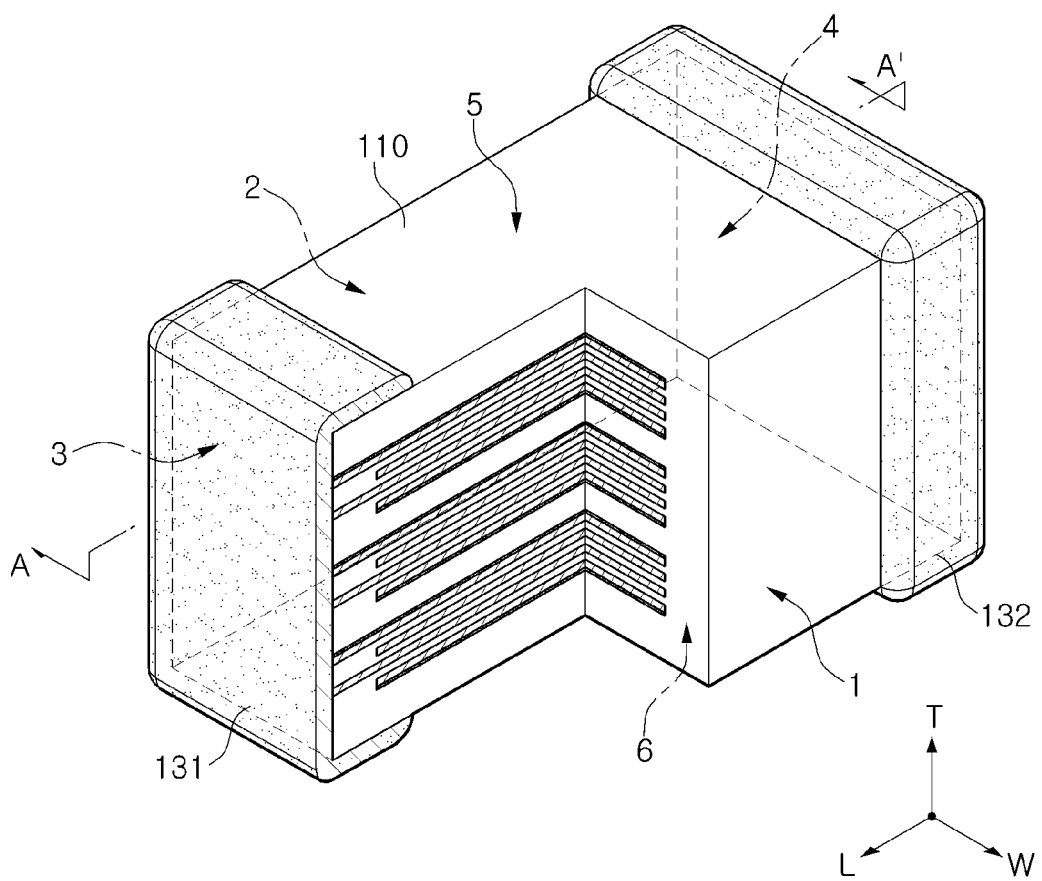
FIG. 1 is a partially cut-away perspective view of a multilayer ceramic electronic component according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Electronic Component

Figure 2:
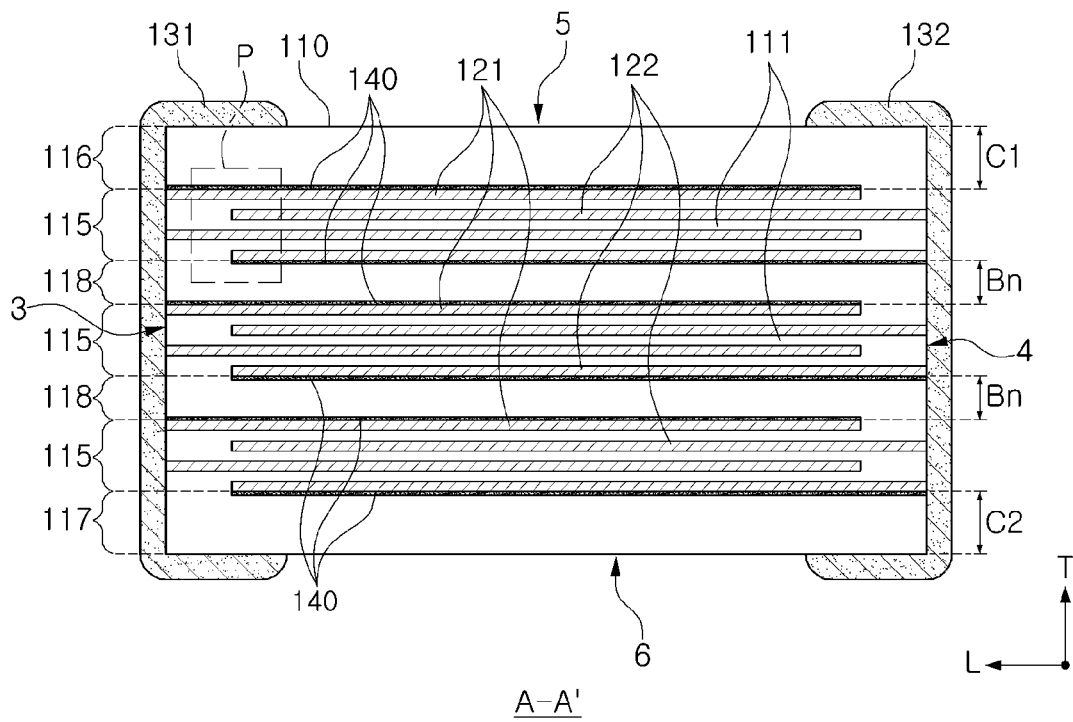
FIG. 2 is a cross-sectional view taken along line A-A' of FIG. 1.

FIG. 1 is a partially cut-away perspective view of a multilayer ceramic electronic component according to an exemplary embodiment of the present disclosure, and FIG. 2 is a cross-sectional view taken along line A-A' of FIG. 1.

Referring to FIG. 1, a multilayer ceramic electronic component 100 according to an exemplary embodiment of the present disclosure may include a ceramic body 110; and external electrodes 131 and 132.

According to an exemplary embodiment of the present disclosure, a T-direction shown in FIGS. 1 and 2 refers to a thickness direction of the ceramic body 110, an L-direction refers to a length direction of the ceramic body 110, and a W-direction refers to a width direction of the ceramic body 110.

The thickness (T) direction refers to a direction in which internal electrodes and dielectric layers are stacked.

Referring to FIGS. 1 and 2, the ceramic body 110 may have first and second side surfaces 1 and 2 opposing each other in the width direction, third and fourth end surfaces 3 and 4 opposing each other in the length direction, and first and second main surfaces 5 and 6 opposing each other in the thickness direction. A shape of the ceramic body 110 is not particularly limited. For example, the ceramic body 110 does not have a perfect hexahedral shape but may have a substantially hexahedral shape.

As shown in FIG. 2, the ceramic body may include a plurality of active parts 115, two cover parts 116 and 117, and at least one interlayer margin part 118, and the interlayer margin part 118 may be disposed between the active parts 115, and the cover parts 116 and 117 may be respectively disposed on an upper portion of an uppermost active part and a lower portion of a lowermost active part.

Unless particularly described, the upper and lower portions are not separately distinguished from each other in the ceramic body, but may be considered as one portion and the other portion in the thickness direction, that is, a portion of one region in the thickness direction and a portion of the other region in the thickness direction opposite thereto, respectively.

Referring to FIG. 2, each of the active parts 115 may include internal electrodes 121 and 122 and dielectric layers 111 and be formed by alternately stacking the internal electrodes 121 and 122 and the respective dielectric layers 111. The internal electrodes 121 and 122 may include first and second internal electrodes 121 and 122. The first and second internal electrodes 121 and 122 may be alternately disposed with each of the dielectric layers 111 interposed therebetween. For example, the active part may be formed by repeatedly stacking the internal electrodes and dielectric layers in the thickness direction of the ceramic body in a sequence of the first internal electrode, the dielectric layer, the second internal electrode, and the dielectric layer, and the plurality of active parts 115 may be disposed in the thickness direction of the ceramic body. The active parts 115 may be separated by the interlayer margin part 118 disposed therebetween.

Hereinafter, if necessary, a region in which the active parts 115 and the interlayer margin part 118 disposed between the active parts are stacked will be referred as an intermediate part.

A material for forming the dielectric layers 111 is not particularly limited as long as sufficient capacitance may be obtained, but may be, for example, a barium titanate ($BaTiO_3$) powder. The material for forming the dielectric layers 111 may further contain various ceramic additives, organic solvents, plasticizers, binders, dispersing agents, or the like, according to an object of the present disclosure in addition to the powder such as barium titanate ($BaTiO_3$) powder, or the like.

The interlayer margin part 118 and the cover parts 116 and 117 may be formed of a composition similar to the material forming the dielectric layer 111, and according to an exemplary embodiment of the present disclosure, the interlayer margin part 118 and the cover parts 116 and 117 may contain magnesium (Mg).

The first internal electrode 121 may be exposed to the third end surface 3 of the ceramic body, and the second internal electrode 122 may be exposed to the fourth end surface 4 of the ceramic body.

A material for forming the internal electrodes is not particularly limited, but may be, for example, a conductive paste formed of at least one of silver (Ag), lead (Pg), platinum (Pt), nickel (Ni), and copper (Cu).

According to an exemplary embodiment of the present disclosure, the internal electrodes 121 and 122 may contain nickel (Ni).

The external electrodes 131 and 132 may be disposed on the third and fourth end surfaces 3 and 4 of the ceramic body to be connected to the first and second internal electrodes 121 and 122. The external electrodes 131 and 132 may include first and second external electrodes 131 and 132, the first internal electrode 121 may be connected to the first external electrode 131, and the second internal electrode 122 may be connected to the second external electrode 132.

The external electrodes 131 and 132 may be formed by applying and sintering a conductive paste to the third and fourth end surfaces of the ceramic body, and a shape and a formation method of the external electrodes are not particularly limited.

The cover parts 116 and 117 may be disposed on the upper portion of the uppermost active part and the lower portion of the lowermost active part, respectively, in order to protect the active parts 115 from external impacts. In other words, the cover parts may be disposed on upper and lower portions of the intermediate part.

The cover parts 116 and 117 may include an upper cover part 116 disposed on the upper portion of the intermediate part and a lower cover part 117 disposed on the lower portion of the intermediate part.

In general, in the case in which the internal electrodes and the dielectric layers are thinned, a thickness of the active part may be decreased, and a thickness of a margin part in the thickness direction such as the cover part may be increased. In the case in which the internal electrodes are thinned, a ratio of the internal electrodes formed using a metal as a main ingredient may be decreased, such that a manufacturing cost of the multilayer ceramic electronic component may be decreased. However, in the case in which the thickness of the margin part in the thickness direction is increased in the ceramic body, a carbon component that needs to be removed in a sintering process of the ceramic body may not be removed and may remain in the ceramic body, such that it may be difficult to remove residual carbon.

In addition, when the thickness of the margin part of the ceramic body in the thickness direction is increased in accordance with thinness of the internal electrode as described above, in the case in which the margin part in the thickness direction is only configured of upper and lower parts, a thickness of the upper and lower cover parts may be increased.

The ceramic body may be formed by stacking a plurality of green sheets on which an internal electrode pattern is disposed and green sheets on which the internal electrode pattern is not disposed and then pressing the stacked green sheets in a direction in which the green sheets are stacked. In this case, green sheets for forming the cover parts may be disposed on upper and lower portions of a green sheet multilayer body for forming the active part in which internal electrodes are disposed. In the case in which a thickness of a green sheet multilayer body for forming a cover part is increased, the pressing of the green sheet multilayer body for forming the active part may not be smoothly performed.

In the case in which the pressing of the green sheet multilayer body is not smoothly performed, delamination may occur between the internal electrode and the dielectric layer.

In the multilayer ceramic electronic component according to an exemplary embodiment of the present disclosure, a single active part included in a ceramic body according to the related art is divided and accordingly, a plurality of active parts may be disposed, and the at least one interlayer margin part 118 is disposed between the active parts 115 to disperse the margin parts in the thickness direction, such that organic ingredients remaining in the ceramic body may be effectively discharged to the outside, and pressing processability between the green sheets forming the active part may be improved during a forming process of the ceramic body.

According to an exemplary embodiment of the present disclosure, the margin part in the thickness direction may include the cover parts 116 and 117 and the interlayer margin part 118.

The ceramic body 110 may be formed by sintering the green sheet multilayer body formed by stacking the green sheets on which the internal electrode paste is printed and the green sheets on which the internal electrode paste is not printed. The green sheets on which the internal electrode paste is printed may be stacked to thereby form the active parts 115, and the green sheets on which the internal electrode paste is not printed may form the cover parts 116 and 117 or the interlayer margin part 118.

Unlike an exemplary embodiment of the present disclosure, in the case in which the plurality of active parts are not separated by an interlayer margin part and a single active part is provided, a thickness of a cover part may be increased, and a distance from a central portion of the cover part in a thickness direction to an internal electrode or an outer surface may be increased, such that residual carbon present in the cover part may not be smoothly discharged. In addition, since the thickness of the cover part is increased during a pressing process of a green sheet multilayer body in a manufacturing process of a multilayer ceramic electronic component, the pressing of green sheets for forming the active part may not be smoothly performed.

However, in the case in which the plurality of active parts 115 are disposed in the thickness direction and the interlayer margin part 118 is disposed between the active parts 115 as in an exemplary embodiment of the present disclosure, a residual carbon discharge path of the margin part in the thickness direction may be increased, and the margin part in the thickness direction may be dispersed to a central portion of the ceramic body in the thickness direction, such that the pressing of the green sheets for forming the active part may be facilitated.

However, in the case in which the interlayer margin part 118 is disposed between the active parts 115, residual carbon present in the interlayer margin part 118 that is not completely discharged to the outside of the ceramic body may be accumulated between the interlayer margin part 118 and the active part 115, such that adhesive properties between the interlayer margin part 118 and the active part 115 may be lower than interlayer adhesion in the active parts 115.

In addition, in the case in which residual carbon in the cover parts 116 and 117 is not completely discharged, adhesive properties between the active part 115 and the cover parts 116 and 117 may be lower than the interlayer adhesion in the active parts 115.

However, in the multilayer ceramic electronic component according to an exemplary embodiment of the present disclosure, the cover parts 116 and 117 and the interlayer margin part 118 contain magnesium (Mg), such that a degree of adhesion between the interlayer margin part 118 and the active part 115 and a degree of adhesion between the active part 115 and the cover parts 116 and 117 may be increased.

In addition, the interlayer margin part 118 contains magnesium, such that strength of the interlayer margin part 118 may be increased. Therefore, the overall strength of the ceramic body 110 may be improved.

Figure 3:
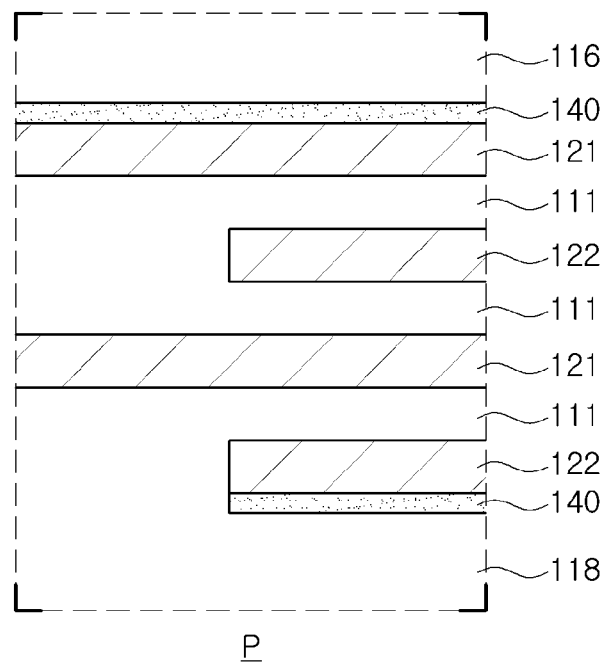
FIG. 3 is an enlarged view of part P of FIG. 2.

FIG. 3 is an enlarged view of part P of FIG. 2.

Referring to FIG. 3, magnesium contained in the cover parts 116 and 117 and the interlayer margin part 118 may react with nickel (Ni) contained in internal electrodes 121 and 122 adjacent thereto in the sintering process of the ceramic body to form magnesium-nickel oxide layers 140 on boundary surfaces between active parts 115 and the cover parts 116 and 117 adjacent thereto and on boundary surfaces between the active parts 115 and the interlayer margin part 118 adjacent thereto, such that the magnesium-nickel oxide layer 140 may improve interlayer adhesive properties.

A material of the magnesium-nickel oxide layer 140 may be represented by the following Chemical Formula: $(Mg_xNi_{1-x})O$, and be a solid solution of a magnesium oxide and a nickel oxide. x may be a rational number satisfying $0<x<1$.

According to an exemplary embodiment of the present disclosure, a thickness of the interlayer margin part 118 may be equal to or more than 5 times a thickness of the dielectric layer 111. In the case in which the thickness of the interlayer margin part 118 is equal to or more than 5 times the thickness of the dielectric layer 111 in the active part, capacitance formed by internal electrodes disposed with the interlayer margin part interposed between the internal electrodes may be decreased, such that designed capacitance may be implemented.

According to an exemplary embodiment of the present disclosure, the thickness of the interlayer margin part 118 may be equal to or more than a half of the thickness of the cover parts 116 and 117. Referring to FIG. 2, when the thickness of the cover parts 116 and 117 is defined as C, and the thickness of the interlayer margin part 118 is defined as Bn, the following Equation may be satisfied: $C/2 \leq Bn$. In the case in which the thickness of the interlayer margin part is equal to or more than a half of the thickness of the cover part, dispersion efficiency of the margin part of the ceramic body in the thickness direction may be improved, and pressure may be effectively transferred up to the green sheet configuring the active part at the time of pressing the green sheet multilayer body in the manufacturing process of the multilayer ceramic electronic component. Therefore, electrical characteristics and reliability of the multilayer ceramic electronic component may be improved.

According to an exemplary embodiment of the present disclosure, the thickness of the interlayer margin part 118 may be equal to or less than the thickness of the cover parts 116 and 117.

The thickness C of the cover parts 116 and 117 may refer to an average of a thickness of the upper cover part and a thickness of the lower cover part, and when the thickness of the upper cover part 116 is defined as C1, and the thickness of the lower cover part 117 is defined as C2, C may be defined as (C1+C2)/2 ($C=(C1+C2)/2$).

According to an exemplary embodiment of the present disclosure, the cover parts 116 and 117 may contain magnesium (Mg) in an amount of 1 mol % to 2.5 mol %. In the case in which the content of magnesium contained in the cover parts 116 and 117 is less than 1 mol %, formation of the magnesium-nickel oxide layers 140 between the cover parts 116 and 117 and the active parts 115 may be insignificant, such that it may be difficult to secure interlayer adhesive properties, and in the case in which the content of magnesium contained in the cover parts 116 and 117 is greater than 2.5 mol %, a secondary phase may be formed in the cover parts, and the electric characteristics may be deteriorated.

According to an exemplary embodiment of the present disclosure, the interlayer margin part 118 may contain magnesium in an amount of 1 mol % or more, the minimum magnesium content of the cover parts 116 and 117. In the case in which the content of magnesium contained in the interlayer margin part 118 is 1 mol % or more, adhesiveness between the interlayer margin part and the active part may be improved, and a thermal crack occurrence rate of the interlayer margin part may be decreased due to an increase in mechanical strength of the interlayer margin part 118.

According to an exemplary embodiment of the present disclosure, when a content (mol %) of magnesium contained in the upper or lower cover part 116 or 117 is defined as $[Mg]_C$, the content (mol %) of magnesium contained in the interlayer margin part 118 is defined as $[Mg]_B$, the thickness of the cover parts 116 and 117 is defined as C, and the thickness of the interlayer margin part 118 is defined as Bn, the following Equation may be satisfied: $[Mg]_B \leq 2 \times [Mg]_C \times (Bn/C)$. The thickness C of the cover parts 116 and 117 may be the average of a thickness of the upper cover part and a thickness of the lower cover part, and when the thickness of the upper cover part 116 is defined as C1, and the thickness of the lower cover part 117 is defined as C2, C may be defined as (C1+C2)/2.

Since unlike the cover parts, in the case of the interlayer margin part 118, active parts adjacent thereto are disposed on two portions, that is, upper and lower portions of the interlayer margin part, magnesium contained in the interlayer margin part may react with two active parts adjacent thereto.

Therefore, the interlayer margin part 118 may contain magnesium in an amount up to 2 times the product ($[Mg]_C \times (Bn/C)$) of the content of magnesium in the cover part and a thickness ratio of the interlayer margin part to the cover part.

In the case in which the content of magnesium in the interlayer margin part 118 is greater than 2 times the product ($[Mg]_C \times (Bn/C)$) of the content of magnesium in the cover part and the thickness ratio (Bn/C) of the interlayer margin part to the cover part, that is, the content of magnesium in the interlayer margin part is greater than $2 \times [Mg]_C \times (Bn/C)$, cracks may be caused at an interface between the interlayer margin part 118 and the active part 115 due to a difference in shrinkage behavior.

In addition, the content of magnesium in the interlayer margin part 118 is more than $2 \times [Mg]_C \times (Bn/C)$, the magnesium-nickel oxide layer may not be formed, and the secondary phase may be formed due to remaining magnesium, such that the electrical characteristics may be deteriorated.

Magnesium contained in the cover parts 116 and 117 and the interlayer margin part 118 may be contained in forms such as magnesium oxide (MgO), magnesium carbonate ($MgCO_3$), and the like, but is not particularly limited.

Method of Manufacturing Multilayer Ceramic Electronic Component

Figure 4:
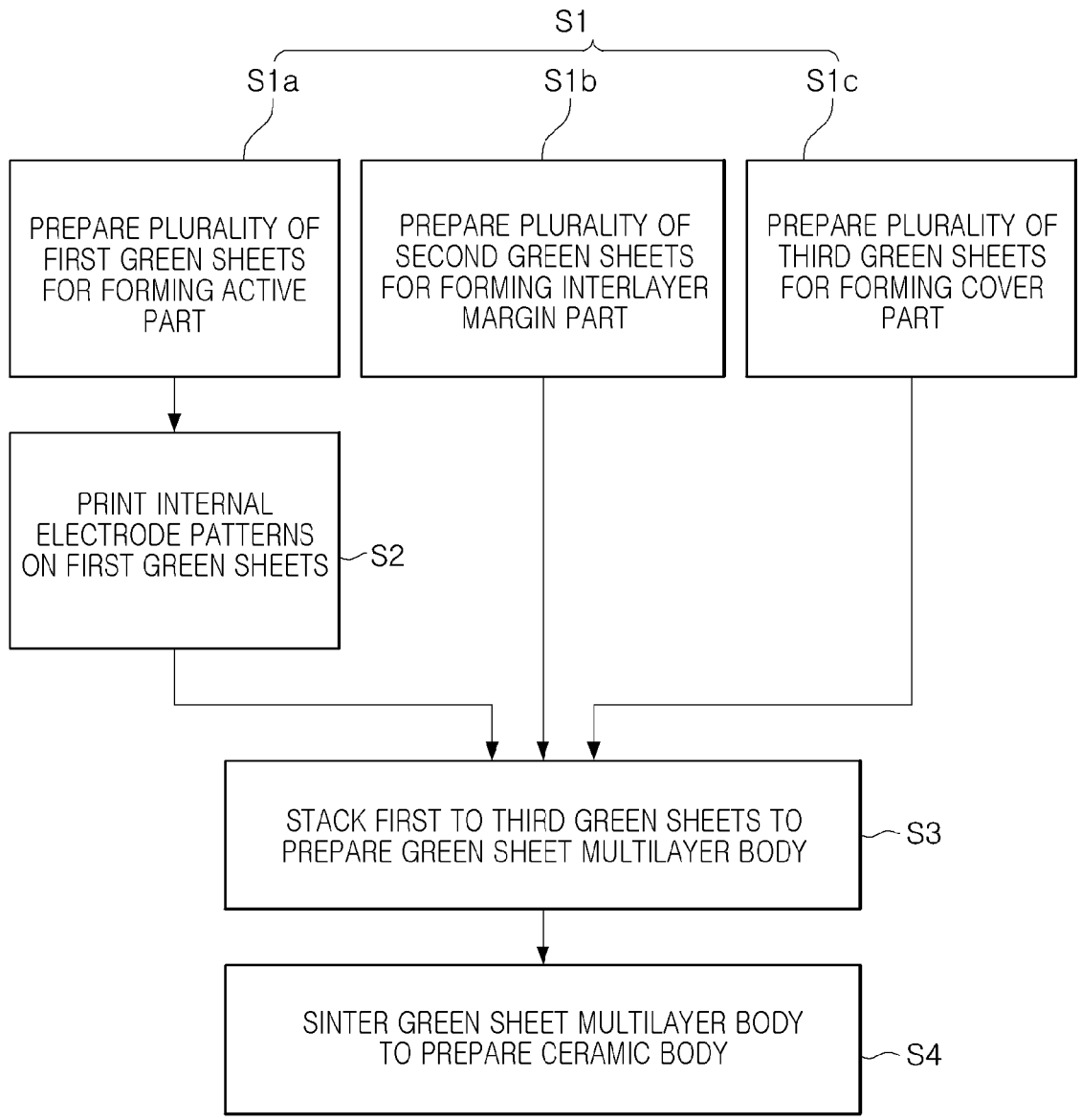
FIG. 4 is a flow chart showing a method of manufacturing a multilayer ceramic electronic component according to an exemplary embodiment of the present disclosure.

FIG. 4 is a flow chart showing a method of manufacturing a multilayer ceramic electronic component according to an exemplary embodiment of the present disclosure.

The method of manufacturing a multilayer ceramic electronic component according to the present exemplary embodiment may include: preparing first to third green sheets (S1); printing an internal electrode pattern on the first green sheet (S2); preparing a green sheet multilayer body (S3); and preparing a ceramic body (S4).

Among descriptions of the method of manufacturing a multilayer ceramic electronic component according to the present exemplary embodiment, a description overlapped with that of the above-mentioned multilayer ceramic electronic component according to an exemplary embodiment of the present disclosure will be omitted, and a difference therebetween will be mainly described below.

The first green sheet may be a green sheet for forming an active part (S1a), the second green sheet may be a green sheet for forming an interlayer margin part (S1b), and the third green sheet may be a green sheet for forming a cover part (S1c). Each of the first to third green sheets may be formed in plural.

The internal electrode pattern may be printed on the respective first green sheets, and the first green sheets on which the internal electrode pattern is printed may be stacked to thereby form the active parts.

At least one or more second green sheets may be stacked to thereby form the interlayer margin part, and at least one or more third green sheets may be stacked to thereby form the cover parts.

Then, the first to third green sheets may be stacked so that the interlayer margin part is disposed between the active parts and the cover parts may be formed on an upper portion of an uppermost active part and a lower portion of a lowermost active part to thereby prepare the green sheet multilayer body.

Then, the green sheet multilayer body may be sintered, thereby forming the ceramic body.

The second and third green sheets may contain magnesium in an amount of 1 mol % or more, such that the interlayer margin part and the cover parts may contain magnesium in an amount of 1 mol % or more.

The third green sheets may contain magnesium in an amount of 2.5 mol % or less in order to prevent electrical characteristics of the multilayer ceramic electronic component from being deteriorated.

According to an exemplary embodiment of the present disclosure, when a content (mol %) of magnesium contained in the second green sheets is defined as $[Mg]_2$ a content (mol %) of magnesium contained in the third green sheets is defined as $[Mg]_3$, the average thickness of the cover parts is defined as C, and the thickness of the interlayer margin part is defined as Bn, the following Equation may be satisfied: $[Mg]_2 \leq 2 \times [Mg]_3 \times (Bn/C)$. In the case in which $[Mg]_2$ is more than $2 \times [Mg]_3 \times (Bn/C)$, cracks may occur between the interlayer margin part and the active parts, and the electrical characteristics may be deteriorated.

The green sheet multilayer body may be sintered at 1150° C. or less under oxygen partial pressure ($PO_2$) conditions of about $10^{-11}$ atm to $10^{-10}$ atm so that magnesium-nickel oxide layers are formed between the active part and the cover part and between the active part and the interlayer margin part.

Experimental Example

The following Table 1 shows data obtained by observing a thermal crack occurrence rate of an interlayer margin part and an interface crack occurrence rate between the interlayer margin part and an active part depending on relationship between a content of magnesium in a cover part and a content of magnesium in the interlayer margin part.

Multilayer ceramic electronic components of Table 1 were manufactured as follows.

Slurry containing powder such as barium titanate ($BaTiO_3$), or the like, was applied to carrier films and dried thereon to prepare a plurality of first green sheets.

A plurality of second and third green sheets containing powder such as barium titanate ($BaTiO_3$), or the like, and magnesium were prepared. The third green sheets were prepared to allow the cover part to contain 1 mol % of magnesium ($[Mg]_C$=1 mol %), and the second green sheets were variously prepared so that a content of magnesium contained in the interlayer margin part to be '$[Mg]_B$ (content of magnesium contained in the interlayer margin part)' as shown in the following Table 1.

Then, a conductive paste for an internal electrode containing nickel was applied onto the first green sheets by a printing method to form internal electrode patterns.

Next, the first green sheets on which the internal electrode was printed and the second and third green sheets were stacked and then, be isostatically pressed. The pressed green sheet multilayer body was cut into an individual chip form so that one ends of the internal electrode patterns were alternately exposed through cut surfaces, and then the cut chip was subjected to a debinding process.

Thereafter, the chip was sintered at 1150° C. or less and under oxygen partial pressure ($PO_2$) conditions of about $10^{-11}$ atm to $10^{-10}$ atm so that magnesium-nickel oxide layers were formed, thereby forming a ceramic body. After sintering, the ceramic body had a size of 1.0 mm×0.5 mm×0.5 mm (length×width×thickness (L×W×T), 1005 size, an error range of ±0.2 mm). Four active parts, three interlayer margin parts, a single upper cover part and a single lower cover part as the cover part were disposed in the ceramic body. Thicknesses of the interlayer margin part and the cover part were about 15 μm and were substantially equal to each other.

A thickness of each dielectric layer included in the active part was about 1.2 μm, and a thickness of each internal electrode contained in the active part was about 1.1 μm.

In the following Table 1, the thermal crack occurrence rate of the interlayer margin part was measured by observing the number of multilayer ceramic electronic components in which cracks were caused in the interlayer margin part at the time of performing a lead heat resistance test at 350° C. on 100 manufactured multilayer ceramic electronic components, and the interface crack occurrence rate of the interlayer margin part was measured by observing the number of multilayer ceramic electronic component in which cracks were caused in an interface of the interlayer margin part at the time of performing a lead heat resistance test at 350° C. on 100 manufactured multilayer ceramic electronic components.

Experimental Examples of the following Table 1 were performed under the condition that $2 \times [Mg]_C \times (Bn/C)$ was $2 \times 1$ mol %×1=2 mol %.

TABLE 1

| Sample | $[Mg]_B$ (mol %) | Thermal Crack occurrence rate of Interlayer Margin Part (ea/ea) | Interface Crack occurrence rate of Interlayer Margin Part (ea/ea) |
|---|---|---|---|
| 1* | 0 | 7/100 | 6/100 |
| 2* | 0.2 | 6/100 | 4/100 |
| 3* | 0.4 | 4/100 | 3/100 |
| 4* | 0.6 | 6/100 | 0/100 |
| 5* | 0.8 | 4/100 | 0/100 |
| 6 | 1 | 0/100 | 0/100 |
| 7 | 1.2 | 0/100 | 0/100 |
| 8 | 1.4 | 0/100 | 0/100 |
| 9 | 1.6 | 0/100 | 0/100 |
| 10 | 1.8 | 0/100 | 0/100 |
| 11 | 2 | 0/100 | 0/100 |
| 12* | 2.2 | 0/100 | 2/100 |
| 13* | 2.4 | 0/100 | 3/100 |
| 14* | 2.6 | 0/100 | 8/100 |
| 15* | 2.8 | 0/100 | 10/100 |
| 16* | 3 | 0/100 | 13/100 |

*indicates Comparative Examples.

As shown in Table 1, it may be confirmed that in the cases of samples 1 to 5 in which the content of magnesium of the interlayer margin part was less than 1 mol %, mechanical strength was insufficiently secured, such that the thermal crack occurrence rate of the interlayer margin part was high, and in the case of samples 12 to 16 in which the content of magnesium of the interlayer margin part was greater than $2 \times [Mg]_C \times (Bn/C)$ (that is, 2 mol %), as a difference in the content of magnesium between the cover part and the interlayer margin part was increased, a difference in a sintering behavior between the cover part and the interlayer margin part was increased, such that the interface crack occurrence rate of the interlayer margin part was increased.

As set forth above, according to exemplary embodiments of the present disclosure, the multilayer ceramic electronic component having excellent mechanical strength and electrical characteristics, and the method of manufacturing the same may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component comprising:
   a plurality of active parts including a plurality of dielectric layers and a plurality of internal electrodes that are alternately disposed, the plurality of active parts being stacked;
   an interlayer margin part disposed between the active parts adjacent to each other and containing magnesium;
   an upper cover part disposed on an upper portion of an uppermost active part among the plurality of active parts and containing magnesium; and
   a lower cover part disposed on a lower portion of a lowermost active part among the plurality of active parts and containing magnesium,
   wherein the upper and lower cover parts and the interlayer margin part include magnesium-nickel oxide layers formed on interfaces thereof adjacent to the active parts.

2. The multilayer ceramic electronic component of claim 1, wherein the upper or lower cover part contains magnesium in an amount of 1 mol % to 2.5 mol %.

3. The multilayer ceramic electronic component of claim 1, wherein the interlayer margin part contains magnesium in an amount of 1 mol % or more.

4. The multilayer ceramic electronic component of claim 1, wherein when a content (mol %) of magnesium contained in the upper or lower cover part is defined as $[Mg]_C$, a content (mol %) of magnesium contained in the interlayer margin part is defined as $[Mg]_B$, a thickness of the upper cover part is defined as C1, a thickness of the lower cover part is defined as C2, and a thickness of the interlayer margin part is defined as Bn, $[Mg]_B \leq 2 \times [Mg]_C \times [Bn/\{(C1+C2)/2\}]$ is satisfied.

5. The multilayer ceramic electronic component of claim 1, wherein when a thickness of the upper cover part is defined as C1, a thickness of the lower cover part is defined as C2, and a thickness of the interlayer margin part is defined as Bn, $(C1+C2)/4 \leq Bn$ is satisfied.

6. The multilayer ceramic electronic component of claim 5, wherein the magnesium-nickel oxide layers are formed of a material represented by $(Mg_xNi_{1-x})O$ and are in a solid solution form of a magnesium oxide and a nickel oxide.

7. A multilayer ceramic electronic component comprising:
   a ceramic body including a plurality of active parts including a plurality of dielectric layers and a plurality of internal electrodes that are alternately disposed;
   an interlayer margin part separating the active parts from each other within the ceramic body;
   cover parts disposed on an upper portion of an uppermost internal electrode and a lower portion of a lowermost internal electrode among the plurality of internal electrodes, within the ceramic body,
   wherein the interlayer margin part and the cover parts are formed of a dielectric composition different from that of the dielectric layers and contain magnesium in an amount of 1 mol % or more.

8. The multilayer ceramic electronic component of claim 7, wherein the cover parts contain magnesium in an amount of 1 mol % to 2.5 mol %.

9. The multilayer ceramic electronic component of claim 7, wherein when a content (mol %) of magnesium contained in the cover parts is defined as $[Mg]_C$, a content (mol %) of magnesium contained in the interlayer margin part is defined as $[Mg]_B$, a thickness of the cover parts is defined as C, and a thickness of the interlayer margin part is defined as Bn, $[Mg]_B \leq 2 \times [Mg]_C \times (Bn/C)$ is satisfied.

10. The multilayer ceramic electronic component of claim 7, wherein the cover parts and the interlayer margin part include magnesium-nickel oxide layers formed in regions adjacent to interfaces between the internal electrodes and the cover parts and adjacent to interfaces between the internal electrodes and the interlayer margin part.

11. The multilayer ceramic electronic component of claim 10, wherein the magnesium-nickel oxide layers are formed of a material represented by $(Mg_x Ni_{1-x})O$ and are in a solid solution form of a magnesium oxide and a nickel oxide.

\* \* \* \* \*